US007427715B2

(12) United States Patent
Kuo

(10) Patent No.: US 7,427,715 B2

(45) Date of Patent: Sep. 23, 2008

(54) CABLE ASSEMBLY AND METHOD OF MAKING THE SAME

(75) Inventor: Peter Kuo, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/796,581

(22) Filed: Apr. 26, 2007

(65) Prior Publication Data

US 2007/0251724 A1 Nov. 1, 2007

(30) Foreign Application Priority Data

Apr. 27, 2006 (CN) ........................ 2006 1 0040071

(51) Int. Cl.
*H02G 15/02* (2006.01)

(52) U.S. Cl. .......................... 174/74 R; 174/78; 174/79

(58) Field of Classification Search ............... 174/74 R, 174/74 A, 75 B, 75 C, 77 R, 135, 10, 102 R, 174/102 C
See application file for complete search history.

(56) References Cited

U.S. PATENT DOCUMENTS 4,461,529 A * 7/1984 Fariss ......................... 439/604
4,634,208 A * 1/1987 Hall et al. ................... 439/610
4,930,856 A * 6/1990 Pelta ........................... 385/87
5,641,307 A * 6/1997 Gerrans ...................... 439/606
5,792,988 A * 8/1998 McIntire et al. ........... 174/74 R
5,885,108 A * 3/1999 Gerrans, Jr. ................. 439/606
6,372,991 B1 4/2002 Myers
6,419,520 B2 7/2002 Miersch et al.
6,672,894 B2 * 1/2004 Sprunger .................... 439/449
6,793,520 B1 9/2004 Wu

* cited by examiner

Primary Examiner—William H Mayo, III
(74) *Attorney, Agent, or Firm*—Wei Te Chung

(57) ABSTRACT

An cable assembly (100) includes a cable (3) and a strain relief device (20) molded on an end of the cable. The cable (3) includes a center wire (31), a metal braiding (32) enclosing the center wire and a jacket (35) shielding the metal braiding. The strain relief device (20) consists of a first plastic layer (4) pre-molded on the metal braiding (32) and the jacket (35) and the second plastic layer (2) over-molded on the first plastic layer (4). Also, a method of making such cable assembly (100) is given.

16 Claims, 8 Drawing Sheets

CABLE ASSEMBLY AND METHOD OF MAKING THE SAME

BACKGROUND OF THE INVENTION

1. Field of the Invention

The present invention generally relates to a cable assembly and a method of making the same, and more particularly to a cable assembly with a strain relief device and a method of making such cable assembly with the strain relief device.

2. Description of Related Art

At present, notebooks, projections and other portable electrical devices are widely used, and cables are needed to connect one such electrical device with a power source. When those portable devices are used, customers may move them from one position to another, for instance, a customer may take his/her notebook from one table to another table nearby, or a customer may shift his/her projection from one location to another to adjust projecting angle and get better video effect. Thus, a relative stronger torsion is applied to the cable end connecting to the electrical device, thus, the cable may be damaged. A universal method of reducing such torsion is to mold an extra plastic portion onto the cable end to increase its strength, however, this kind of method does not well satisfy special need.

For example, U.S. Pat. No. 5,061,892 discloses a crimpless strain relief termination for a coaxial cable. The crimpless strain relief termination has a crimpless mechanical termination and a strain relief bushing. The mechanical termination has a knurled bushing that is placed over the coaxial cable in a region where the outer insulating layer has been removed so that the bushing is in electrical contact with the outer shielding conductor of the cable. The outer shielding conductor is folded over the bushing such that the outer shielding conductor is in contact with knurling on the bushing. A heat shrinkable material having an inner adhesive coating is positioned over the bushing and heated to activate the adhesive and shrink the material to capture the shielding conductor between the heat shrinkable material and the bushing. The coaxial cable with the crimpless mechanical termination is inserted into a bore in a strain relief bushing that has an inwardly formed shoulder that engages the crimpless mechanical termination to provide mechanical strain relief for the coaxial cable. However, this kind of crimpless strain relief termination is relatively complex in manufacture and costly in manufacture. These two shortcomings are not glad to be seen by the manufacturers and customers.

Hence, a cable assembly with an improved strain relief device is highly desired to overcome the disadvantages of the related art.

SUMMARY OF THE INVENTION

Accordingly, an object of the present invention is to provide a cable assembly with an improved strain relief device.

Another object of present invention is to provide a method of manufacturing such cable assembly with an improved strain relief device.

In order to achieve the object set forth, a cable assembly in accordance with the present invention comprises a cable and a strain relief device molded on an end of the cable. The cable comprises a center wire, a metal braiding enclosing the center wire and a jacket shielding the metal braiding. The strain relief device comprises a first plastic layer pre-molded over the metal braiding and the jacket and the second plastic layer over-molded on the first plastic layer.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
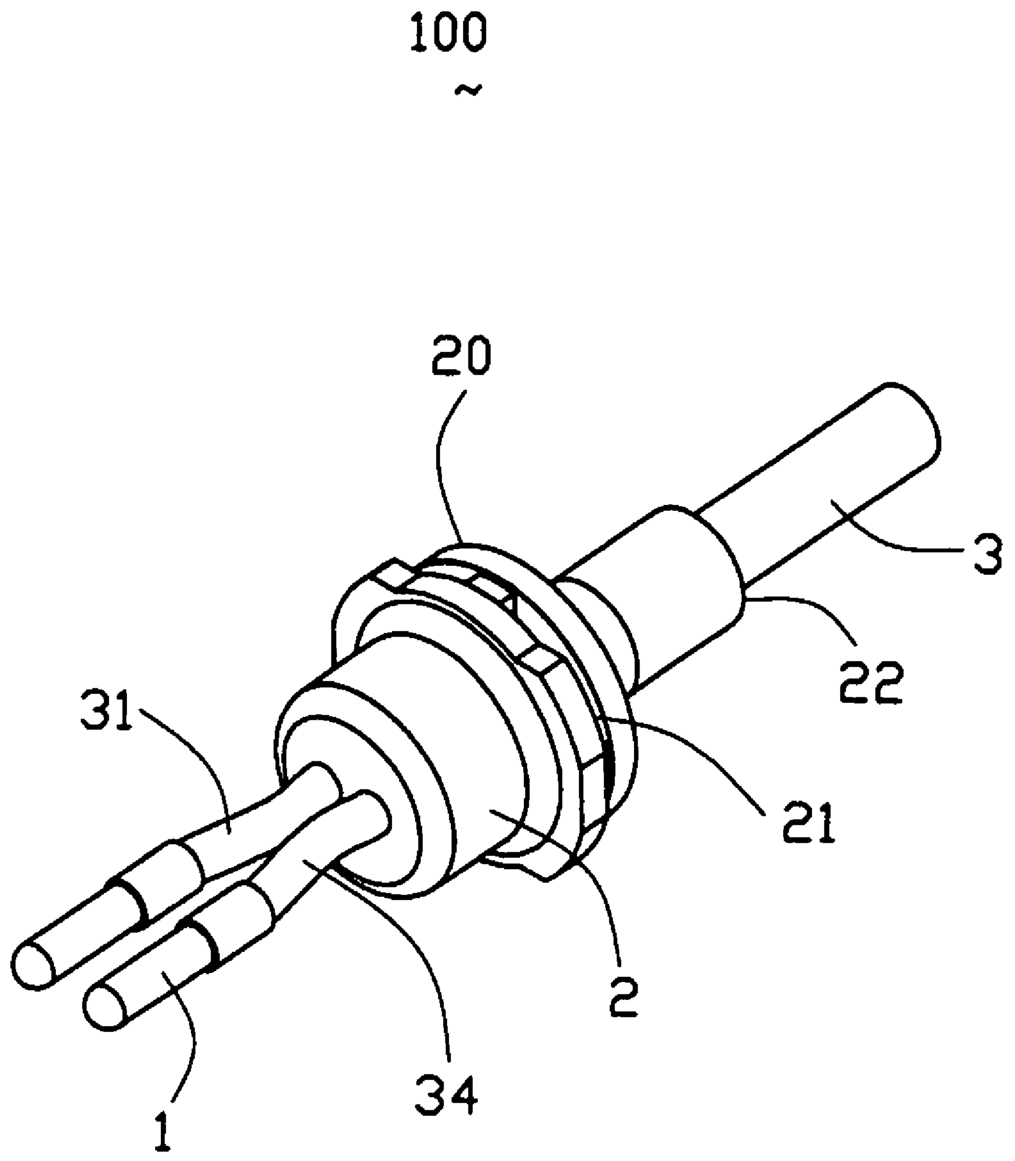
FIG. 1 is an assembled, perspective view of a cable assembly in accordance with the first embodiment of the present invention.
Figure 2:
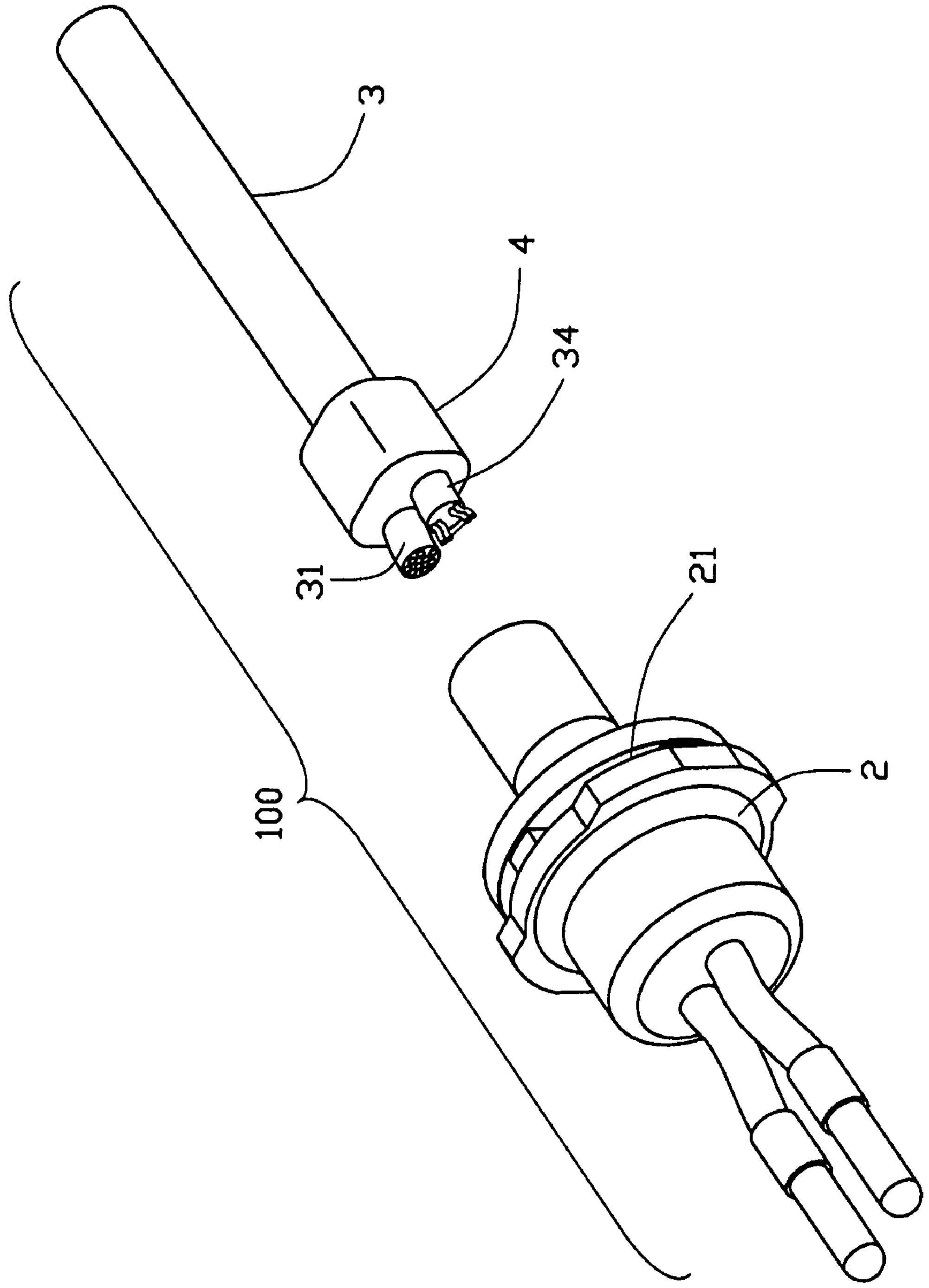
FIG. 2 is an exploded, perspective view of the cable assembly of FIG. 1.

Referring to FIGS. 1-2, a cable assembly 100 in accordance with the first embodiment of the present invention comprises a pair of terminals 1, a cable 3 electrically connecting with the terminals 1 and a strain relief device 20 molded at an end of the cable 3.

Figure 3:
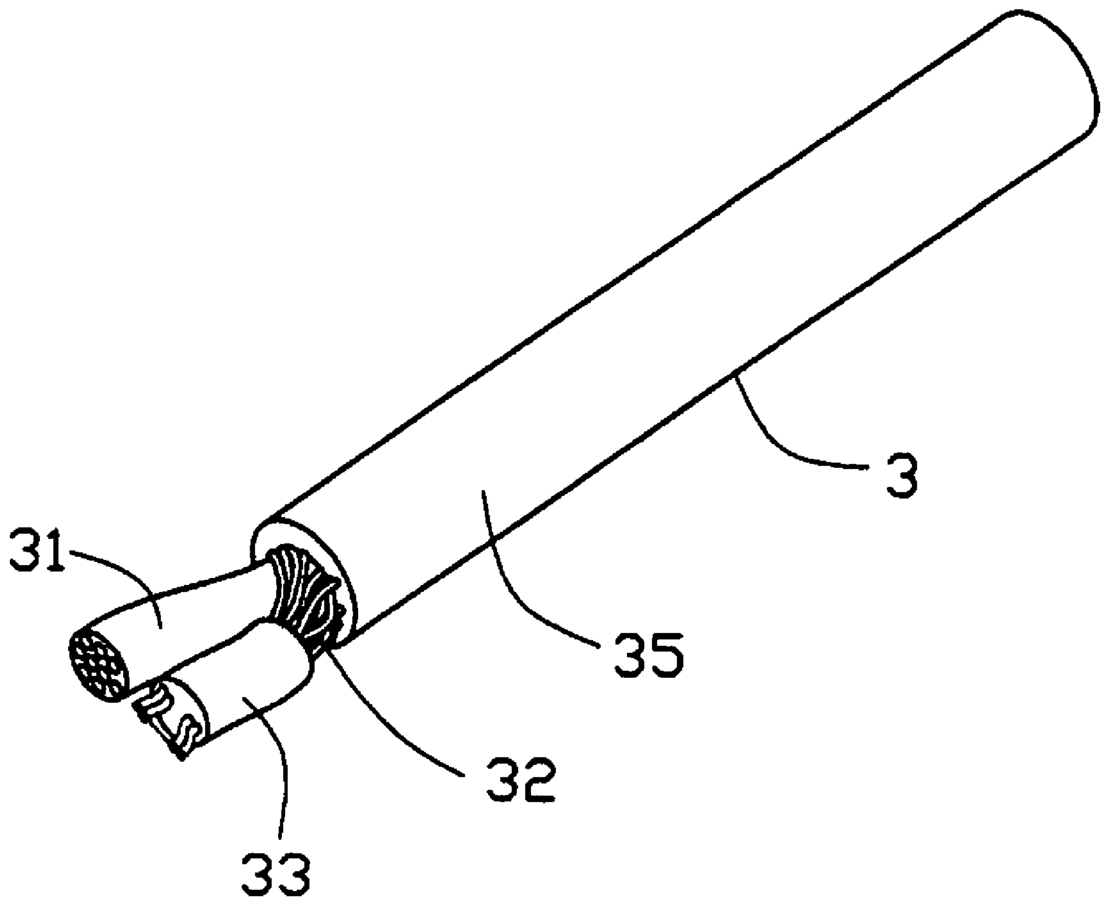
FIG. 3 is a partially assembled view of the cable assembly in accordance with the first embodiment of the present invention.
Figure 4:
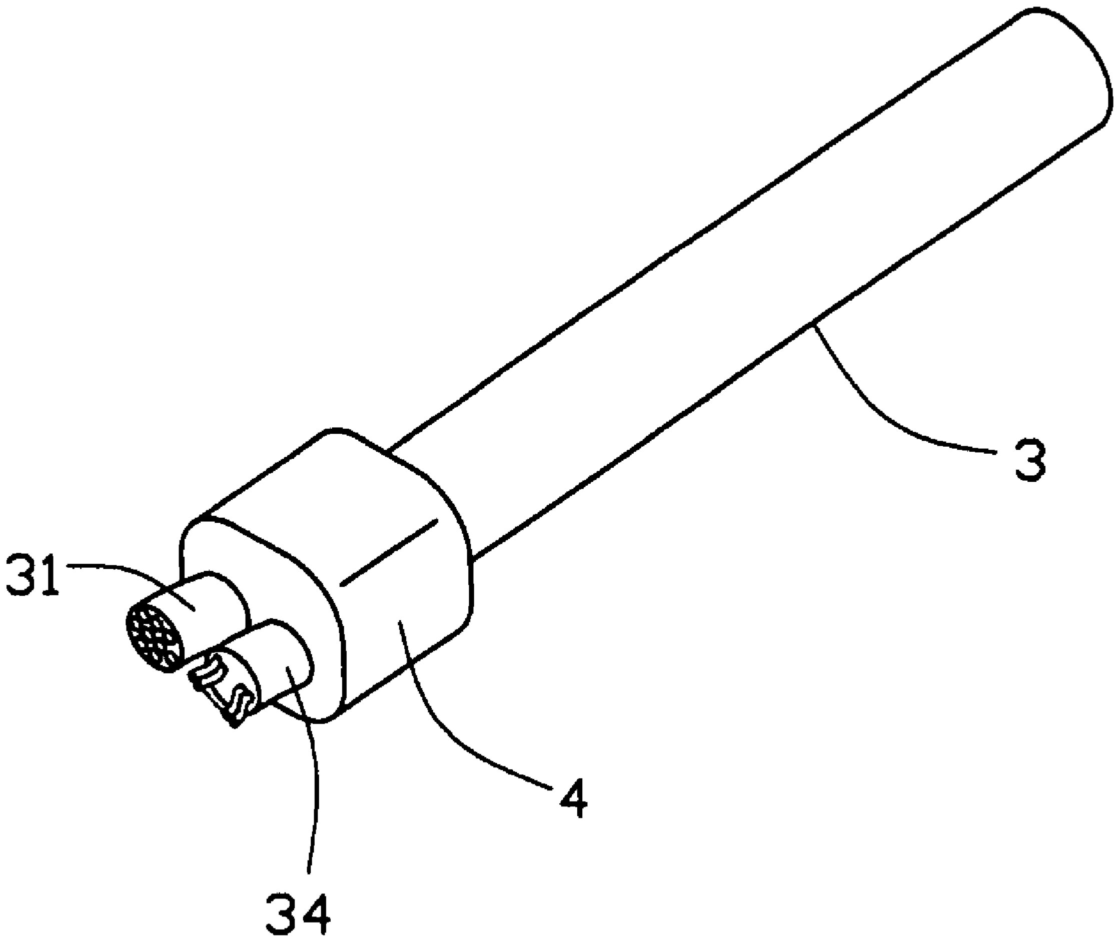
FIG. 4 is another partially assembled view of the cable assembly in accordance with the first embodiment of the present invention.

Referring to FIGS. 3-4 in conjunction with FIGS. 1-2, the cable 3 comprises a center wire 31, a metal braiding 32 enclosing the center wire 31 and a jacket 35 shrouding the metal braiding 32. The strain relief device 20 comprises a first plastic layer 4 pre-molded over an end of the cable 3 with the forward end of the cable 3 exposed beyond the first plastic layer 4 and a second plastic layer 2 over-molded on the first plastic layer 4. The forward end of the jacket 35 is decorticated and the inner metal braiding 32 is exposed outside. The exposed metal braiding 32 is collected together to form into a narrow strip with a heated-shrinking insulative tube 33 enclosed the front part of the exposed metal braid 32 thereon with forward ends of the metal braiding keeping exposed status, with the rear part of the exposed metal braiding 32 just exposed outside. The front part of the exposed metal braiding 32 together with the heated-shrinking insulative tube 33 serv-ers as a second wire 34. The second wire 34 is used for transmitting negative electricity, while the center wire 31 is used for transmitting positive electricity. The first plastic layer 4 is partially pre-molded over part of the center wire 31, part of the second wire 34, the rear part of the exposed metal braiding 32 and the jacket 35 nearby the rear part of the metal braiding 32. The first plastic layer 4 is a kind of high-density plastic material, such as a high-density polyvinyl chloride (PVC 35P). The second plastic layer 2 is over-molded on the outside of the first plastic layer 4 and the jacket 35 of the cable 3 nearby. The second plastic layer 2 is other kind of low-density plastic material, and a low-density polyvinyl chloride (PVC 60) may be a good choice. A slotted-shape fixing portion 21 is formed on the outside of the second plastic layer 2, thus, the cable 3 can be connected to an electrical device (not shown) reliably.

When manufacturing the cable assembly, firstly, the jacket 35 of the cable 3 is partially stripped from the inner metal braiding 32, with the metal braiding 32 exposed outside. Secondly, the exposed metal braiding 32 is peeled off the center wire 31 and collected together to form into a strip with the heated-shrinking insulative tube 33 partially enclosed thereon. Thirdly, the heated-shrinking insulative tube 33 is heated to combine the metal braiding 32 with the heated-shrinking insulative tube 33 together to serve as the second wire 34. Fourthly, the first plastic layer 4 is pre-molded over the center wire 31, the second wire 34, the exposed metal braiding 32 and the jacket 35 adjacent to the exposed metal braiding 32. Fifthly, the second plastic layer 2 is over-molded on the first plastic layer 4 and the jacket 35 adjacent to the first plastic layer 4. The center wire 31 and the second wire 34 can electrically connect with the terminals 1 via soldering or crimping.

Figure 5:
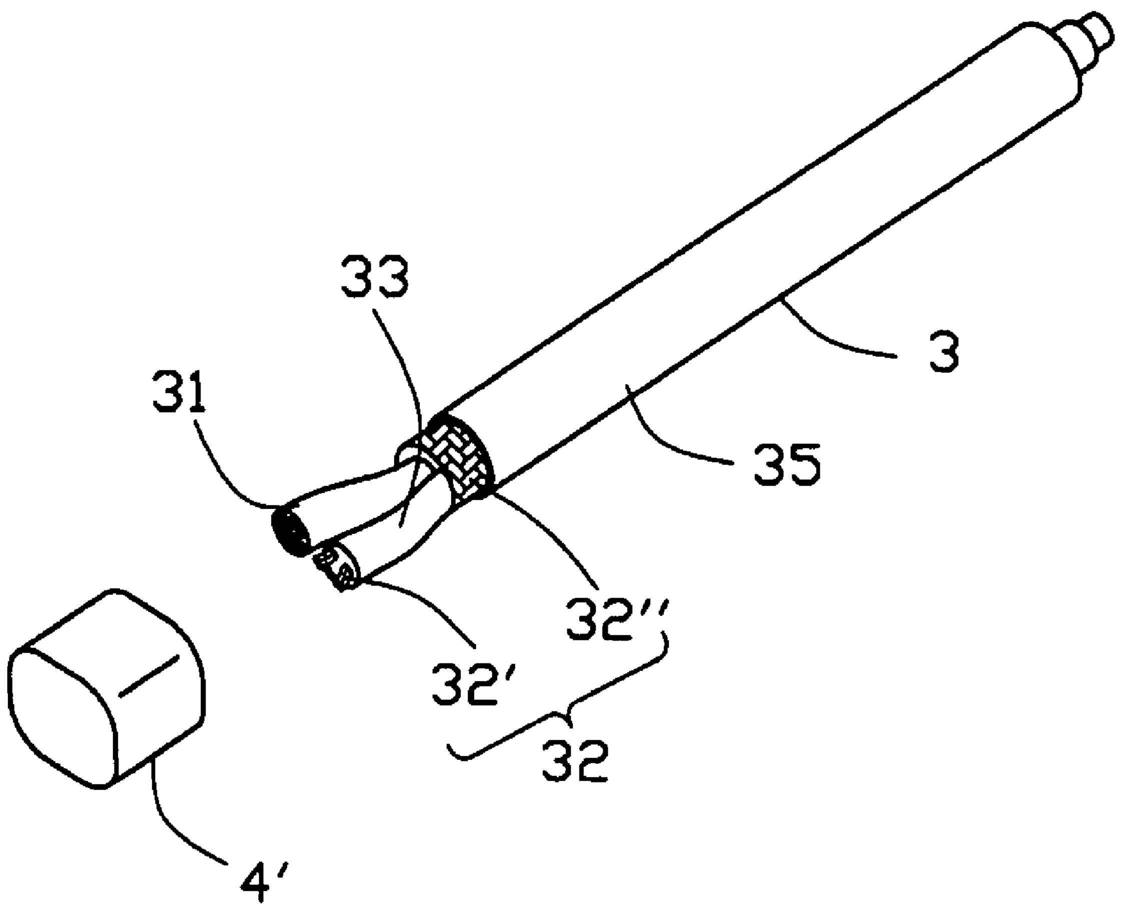
FIG. 5 is a partially assembled view of a cable assembly in accordance with the second embodiment of the present invention.
Figure 6:
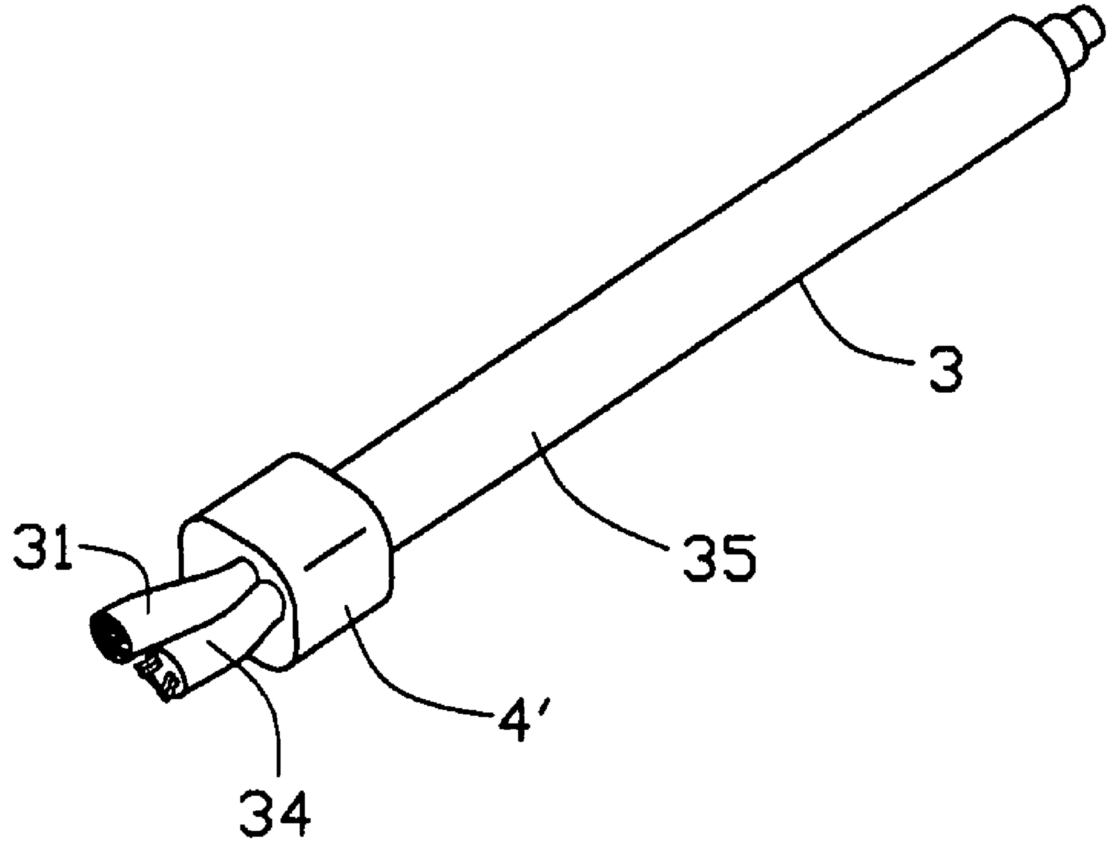
FIG. 6 is an assembled view of the cable assembly of FIG. 5.

The cable assembly of the second embodiment of the present invention is same as the first embodiment of the present invention cable assembly 100 except for a position where a first plastic layer 4' is pre-molded over, and other same structures or manufacturing process are omitted hereinafter. Referring to FIGS. 5-6, the exposed metal braiding 32 consists of a first section 32' of the metal braiding 32 being peeled off the center wire 31 and a second section 32" of the metal braiding 32 just staying on the outside of the center wire 31. The first section 32' of the metal braiding 32 is collected together to form into a strip with a heated-shrinking insulative tube 33 enclosed thereon. The heated-shrinking insulative tube 33 is heated and the first section 32' of the metal braiding 32 and the heated-shrinking insulative tube 33 are combined together to serve as the second wire 34. Then, the first plastic layer 4 is pre-molded over the center wire 31, the second wire 34, the second section 32" of the metal braiding 32 and the jacket 35 adjacent to the second section 32" of the metal braiding 32. As the second section 32" of the metal braiding 32 is stayed on the outside of the center wire 31, and the first plastic layer 4' directly attaches to the outer periphery of the second section 32" of the metal braiding 32. Thus, the second section 32" of the metal braiding 32, the jacket 35 adjacent to the second section 32" of the metal braiding 32 and the first plastic layer 4' may be combined together better.

Figure 7:
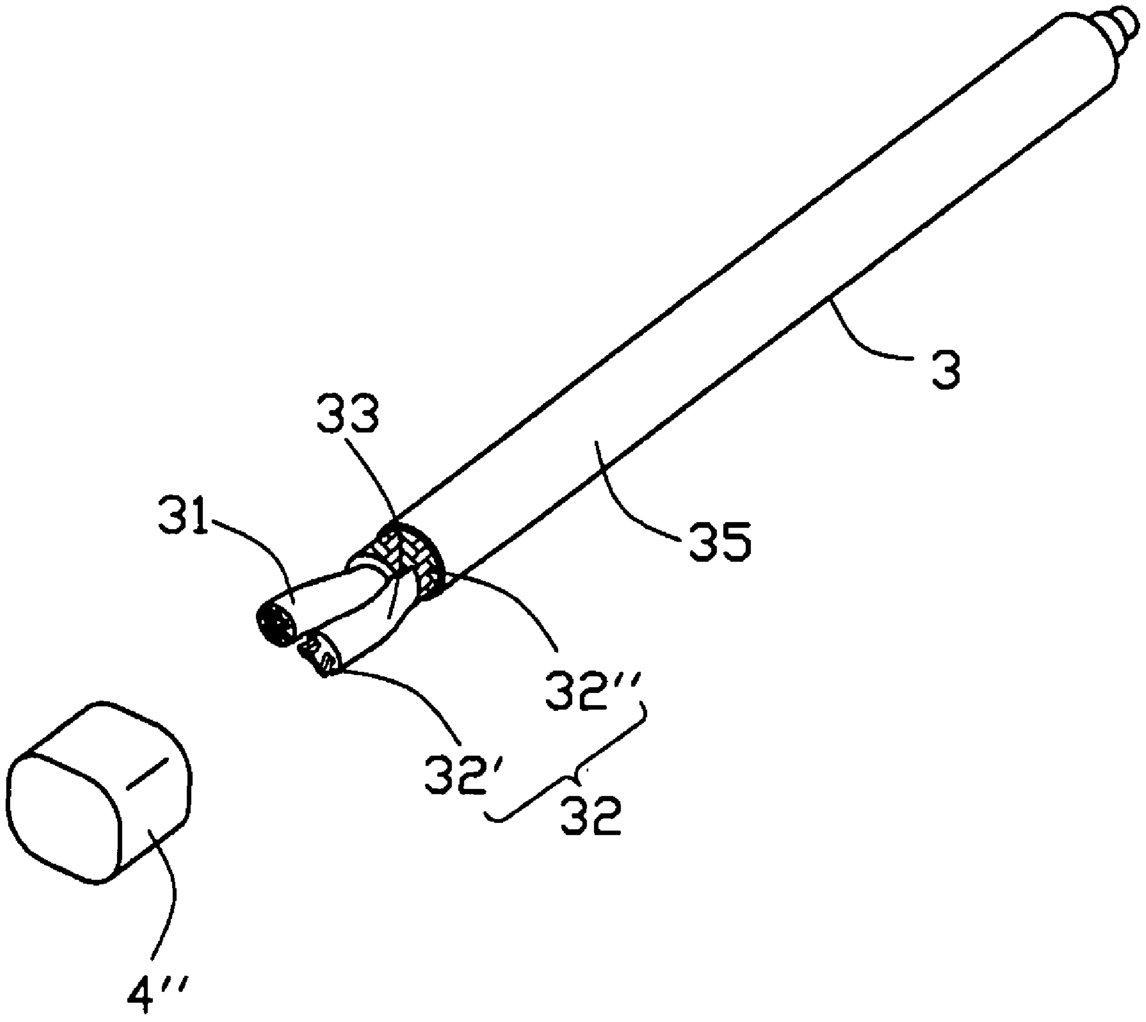
FIG. 7 is a partially assembled view of a cable assembly in accordance with the third embodiment of the present invention.
Figure 8:
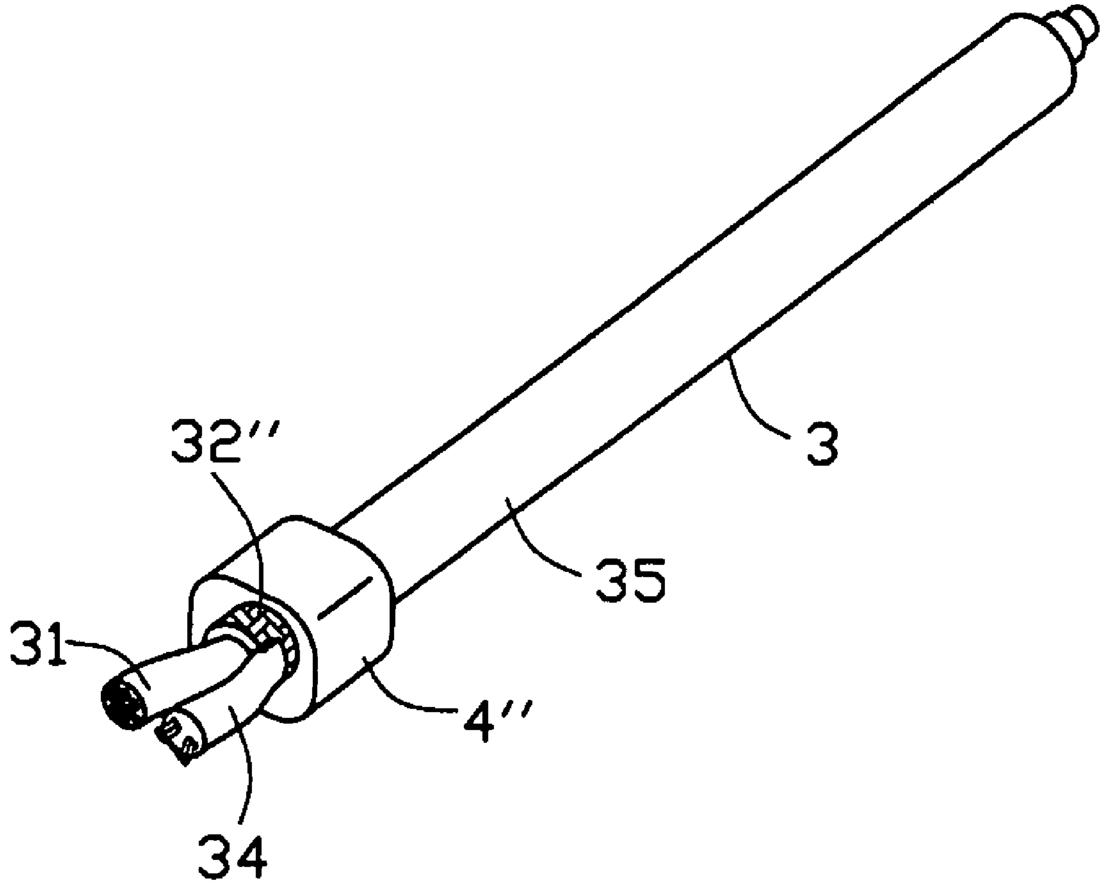
FIG. 8 is an assembled view of the cable assembly of FIG. 7.

The cable assembly of the third embodiment of the present invention is also same as the first embodiment of the present invention cable assembly 100, except for a position where a first plastic layer 4" is pre-molded over, and other same structure or manufacturing process is omitted hereinafter. Referring to FIGS. 7-8, the exposed metal braiding 32 consists of a first section 32' of the metal braiding 32 being peeled off the center wire 31 and a second section 32" of the metal braiding 32 just staying on the outside of the center wire 31. The first section 32' of the metal braiding 32 is collected together to formed into a strip with the heated-shrinking insulative tube 33 enclosed thereon. The heated-shrinking insulative tube 33 is heated and the first section 32' of the metal braiding 32 and the heated-shrinking insulative tube 33 are combined together to serve as the second wire 34. Then, the first plastic layer 4" is pre-molded over outer periphery the second section 32" of the metal braiding 32 and the jacket 35 adjacent to the second section 32" of the metal braiding 32. The manufacturing process may be easier as the first plastic layer 4" is just pre-molded over the second section 32" of the metal braiding 32 and jacket 35.

When using the cable assembly 100, the terminals 1 are connected to an electrical device (not shown), however, it should be known that the center wire 31 and the second wire 34 may be directly electrically connecting with the electrical device without the terminals 1. The cable 3 is positioned on the electrical device via the engagement between the fixing portion 21 formed on the second layer of plastic 2 and corresponding fixing portion (not shown) formed on the electrical device. When a customer moves the electrical device, the cable 3 may swing along substantially cone-shaped trace, as the metal braiding 32 and the jacket 35 of the end of the cable 3 are combined together by the first plastic layer 4, and there is no relative movement between the metal braiding 32 and the jacket 35 of the end of the cable 3, thus, a torsion originally acted on a connection portion between the cable 3 and the electrical device when there is no such strain relief device 20 is shifted to an end 22 of the second plastic layer 2, and the torsion is reduced or eliminated.

It is to be understood, however, that even though numerous characteristics and advantages of the present invention have been set forth in the foregoing description, together with details of the structure and function of the invention, the disclosure is illustrated only, and changes may be made in detail, especially in matters of shape, size, and arrangement of parts within the principles of the invention to the full extent indicated by the broad general meaning of the terms in which the appended claims are expressed.

What is claimed is:

1. A cable for use with an electrical connector and pre-molded with strain relief, comprising:

a center wire including at least one inner conductor enveloped with an insulative layer;

a metal braiding enclosing the insulative layer and having a front section thereof exposed and converged into a strand of wire;

a jacket enclosing the braiding material, and leaving the section of the metal braiding exposed;

a first plastic layer molded to the strand of metal braiding; and a second plastic layer overmolded the first plastic layer, and at least a section of the jacket.

2. The cable as recited in claim 1, wherein the strand of wire is arranged at a side of the center wire.

3. The cable as claimed in claim 1, wherein the first plastic layer is made of high-density polyvinyl chloride.

4. The cable as claimed in claim 1, wherein the second plastic layer is made of low-density polyvinyl chloride.

5. The cable as claimed in claim 1, wherein the cable further comprises a heated-shrinking insulative tube.

6. The cable as claimed in claim 5, wherein the strand of metal braiding is enclosed by the heated-shrinking insulative tube to form a second wire for transmitting negative electricity; and wherein the center wire is adapted transmitting positive electricity.

7. The cable as claimed in claim 6, wherein the first plastic layer is pre-molded over the second wire and the center wire.

8. The cable as claimed in claim 1, wherein the second plastic layer defines a fixing portion adapted for positioning the cable on the electrical device.

9. The cable as claimed in claim 1, further comprising a terminal electrically connecting with the center wire.

10. A cable assembly comprising:

a center wire including an inner conductors surrounded by a first insulator;

a metallic braiding surrounding the center wire and surrounded by an insulative jacket;

a front portion of the jacket being removed to free at least a portion of a front section of the metallic braiding which successively is woven together to form a strand and surrounded by a second insulator to form another wire; wherein said center wire and said another wire are discrete from each other and arranged in a juxtaposed relation rather than a concentric relation.

11. The cable assembly as claimed in claim 10, wherein a strain relief encloses both said center wire and said another wire.

12. The cable assembly as claimed in claim 11, wherein a remainder portion of the front section of the metallic braiding, which is not stranded, is also enclosed in the strain relief.

13. A method of making a cable, the method comprising steps of:

providing a cable comprising at least one interior conductors enveloped with a layer of insulative layer, a metal braiding enclosing the insulative layer and a jacket shrouding the metal braiding;

exposing a section of braiding and converging it into at least one strand;

providing a first strain relief by premolding the strand of metal braiding with an insulative material; and providing a second strain relief by overmolding the first strain relief and at least a section of the jacket with another insulative material.

14. The cable assembly as claim 10, wherein said second insulator is in an over-molded form with regard to the strand.

15. The method as claimed in claim 13, wherein the first strain relief is high-density polyvinyl chloride and the second strain relief is low-density of polyvinyl chloride.

16. The method as claimed in claim 13, wherein an insulative tube is heated to combine with the strand of metal braiding to serve as a second wire for transmitting electricity.

* * * * *